Aug. 27, 1929.  G. L. WALKER  1,726,327
BILLET GOUGING TIP
Filed June 2, 1928
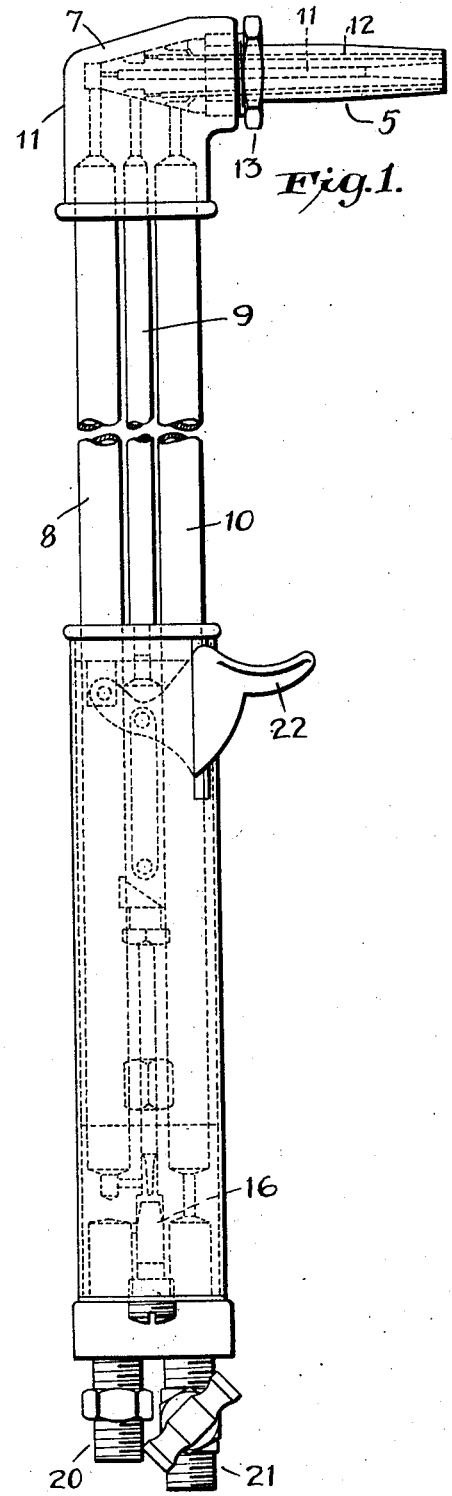
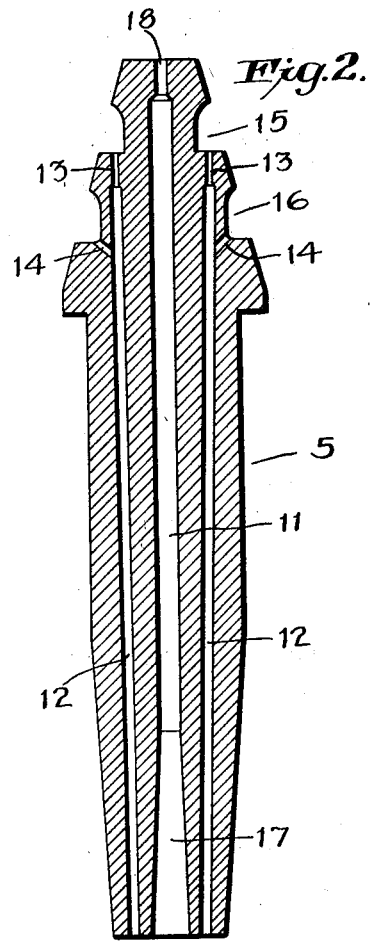
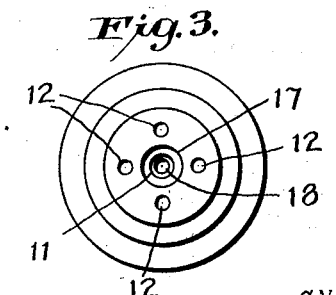

Patented Aug. 27, 1929.

1,726,327

UNITED STATES PATENT OFFICE.

GEORGE L. WALKER, OF NEW YORK, N. Y., ASSIGNOR TO AIR REDUCTION COMPANY, INCORPORATED, OF NEW YORK, N. Y., A CORPORATION OF NEW YORK.

BILLET-GOUGING TIP.

Application filed June 2, 1928. Serial No. 282,292.

The subject of this invention is a torch tip, adapted to be used in a cutting torch, for gouging out seams or other defects in steel billets preparatory to rolling or forging.

In the accompanying drawings forming part hereof:

Fig. 1 is a side elevation of a torch, an intermediate portion of which is broken out, with a tip embodying the invention applied to the torch;

Fig. 2 is a longitudinal section through the tip; and

Fig. 3 is a front end view of the tip.

Fig. 1 illustrates the body of a cutting torch like that shown in the Bucknam Patent 1,254,637, but it will be understood that any suitable torch body of the cutting torch type may be employed.

At the rear end are connections 20 and 21 adapted to receive hose lines leading from the oxygen and acetylene supplies, respectively. Instead of acetylene any other suitable combustible gas may be employed.

The acetylene or other combustible gas passes through pipe 10 to a socket in the head 7. The oxygen is divided within the body of the torch, a portion passing through the pipe 8 to form the "cutting" jet, and another portion passing through the pipe 9 to mix in the tip 5 with the combustible gas to form heating jets. The cutting oxygen branch can be opened and closed by a valve 16 controlled by a hand-piece 22.

The tip 5 has a longitudinal passage 11 for conducting the main stream of oxygen and delivering the same in the form of a comparatively low velocity gouging jet. About this passage the tip is provided with a suitable number of heating jet passages 12, after the manner of an ordinary cutting tip, these passages having inlet ports 13 and 14 for oxygen and the combustible gas, opening from customary grooves 15 and 16, respectively. It will be understood that when the tip is in place in a torch of this design, the passage 11 communicates with a passage leading from the pipe 8, while the grooves 15 and 16 communicate with passages leading from the pipes 9 and 10.

The passages 11 and 12 terminate in orifices at the forward end of the tip. There may be any suitable number of the heating jet passages and orifices.

Whereas an ordinary cutting tip is designed to pass oxygen at a comparatively high velocity at the pressures at which the torch operates most effectively, the tip of the present invention is adapted to reduce the velocity of the oxygen jet materially, while still delivering a large enough volume.

In the present tip the oxygen passage 11 is enlarged, and is provided with a divergently tapered outlet 17 of considerable length, this outlet terminating in a wide delivery orifice. Toward or at the rear end the tip is formed with a narrow constriction 18 through which the gouging oxygen must pass to enter the enlarged bore 11.

The enlarged oxygen passage 11 and the divergently tapered outlet 17 permits of a considerable flow of gouging oxygen at a very low velocity and at the same time causes the oxygen to expand or spread as it issues from the tip. The reducing orifice 18 at the rear end of the passage is to allow the building up of sufficient pressure in the oxygen regulator and back of the point where the oxygen is divided in the body of the torch, so as to stabilize the heating flames supplied by the passages 12. If it were not for this constriction, that is to say, if the enlarged passage 11 extended clear through the tip, the oxygen regulator would have to be set for a very low pressure, and the heating flames would then be greatly affected by the operation of the valve 16. For example, whereas it may be desirable to operate with an oxygen pressure of 50 lbs. at the delivery side of the oxygen regulator, it would be necessary to cut such pressure down to about 5 lbs. if there were no control port such as the constriction 18, a pressure too low for most efficient operation of regulators or preheating flames.

In order to remove a seam or snake from a billet, the torch is held so that the tip is directed obliquely to the surface of the billet and crosswise of the seam, the stream of oxygen for gouging being caused to impinge against the surface at a distance from the seam. The oxygen stream, aided by the heating jets, burns the metal of the billet and blows away the oxide by a scooping action, and as the tip is moved lengthwise of the seam a broad gouge is easily formed which entirely eliminates the defect and which will not close up in subsequent rolling. For this action, a comparatively large, low velocity outflowing stream of oxygen is desired.

It is obvious that the herein described and claimed device may be used for other purposes than the one herein set forth.

I claim:

1. A torch tip for gouging out defects in billets or the like, having oxygen and heating jet passages, said oxygen jet passage having a constriction toward the rear end calculated to maintain high pressure back of that point, and being enlarged from said constriction to an outlet which tapers divergently to the delivery orifice.

2. A torch tip for gouging out defects in billets or the like, having oxygen and heating jet passages, characterized in that said oxygen passage has a constriction toward the rear end calculated to maintain high pressure back of that point, and thereafter conducts the oxygen stream with opportunity to expand to the exit.

3. A torch tip for gouging out defects in billets or the like, having oxygen and heating jet passages, said oxygen jet passage flaring gently to the exit.

GEORGE L. WALKER.